United States Patent
Ye et al.

(10) Patent No.: US 11,506,266 B2
(45) Date of Patent: Nov. 22, 2022

(54) CLASS OF OVER-CONSTRAINED TWO-ROTATION PARALLEL MECHANISM WITH SAME KINEMATICS

(71) Applicant: Yanshan University, Qinhuangdao (CN)

(72) Inventors: Nijia Ye, Qinhuangdao (CN); Bo Hu, Qinhuangdao (CN); Jinjun Zhao, Qinhuangdao (CN); Da Zhang, Qinhuangdao (CN); Luzhou Xu, Qinhuangdao (CN); Kai Wang, Qinhuangdao (CN); Tengfei Xie, Qinhuangdao (CN)

(73) Assignee: YANSHAN UNIVERSITY, Qinhuangdao (CN)

( * ) Notice: Subject to any disclaimer, the term of this patent is extended or adjusted under 35 U.S.C. 154(b) by 134 days.

(21) Appl. No.: 17/143,249

(22) Filed: Jan. 7, 2021

(65) Prior Publication Data
US 2021/0222758 A1 Jul. 22, 2021

(30) Foreign Application Priority Data
Jan. 16, 2020 (CN) .......................... 202010048645.8

(51) Int. Cl.
*F16H 21/46* (2006.01)
(52) U.S. Cl.
CPC ................... *F16H 21/46* (2013.01)
(58) Field of Classification Search
CPC ...... B25J 9/0072; B25J 9/0033; B25J 9/0036; F16H 21/46
See application file for complete search history.

(56) References Cited

U.S. PATENT DOCUMENTS

| | | | | |
|---|---|---|---|---|
| 5,865,063 A | * | 2/1999 | Sheldon | B25J 9/0078 248/653 |
| 2010/0313695 A1 | * | 12/2010 | Valasek | B25J 9/0072 74/490.08 |
| 2014/0083232 A1 | * | 3/2014 | Go | B25J 9/003 74/490.05 |
| 2021/0060763 A1 | * | 3/2021 | Xu | B23Q 1/44 |
| 2022/0234199 A1 | * | 7/2022 | Hayashi | B25J 9/106 |

FOREIGN PATENT DOCUMENTS

| | | | | |
|---|---|---|---|---|
| CN | 105856193 A | * | 8/2016 | ............ B25J 9/0072 |
| CN | 106863276 A | * | 6/2017 | ............ B25J 9/0072 |

* cited by examiner

*Primary Examiner* — Terence Boes
(74) *Attorney, Agent, or Firm* — IPro, PLLC; Na Xu

(57) ABSTRACT

The present invention relates to a class of over-constrained two-rotation parallel mechanism with same kinematics, which comprises a base, a moving platform and four branches connecting the base and the moving platform, wherein the base and the moving platform are equilateral triangles, both ends of each of the first branch, the second branch and the third branch are respectively connected to end points of the base and the moving platform, both ends of the fourth branch are respectively connected to center points of the base and the moving platform, the first branch and the third branch both consist of a first rotating pair. The parallel mechanism of the present invention has a large rotation space and high rigidity, and can be used for positioning equipment such as missile launchers.

6 Claims, 2 Drawing Sheets

CLASS OF OVER-CONSTRAINED TWO-ROTATION PARALLEL MECHANISM WITH SAME KINEMATICS

TECHNICAL FIELD

The invention belongs to the field of parallel mechanisms, and particularly relates to a class of over-constrained two-rotation parallel mechanism with same kinematics.

BACKGROUND TECHNOLOGY

The two-rotation parallel mechanism has a wide range of promising applications for satellite tracking, medical equipment, motion simulation, platform attitude adjustment, etc. The two-rotation parallel mechanism includes two forms: over-constrained and non-over-constrained. At present, the research on the non-over-constrained two-rotation parallel mechanism is more in-depth, such as Chinese patent CN200610102017.3, CN201610303875.8, CN201610989566.0, CN2016109895660 proposed mechanism with simple structure and flexible rotation, but less rigidity compared with the over-constrained two-rotation parallel mechanism; in the two-rotation over-constrained parallel mechanism proposed by Chinese patent CN201310600845.X, the motion is completely decoupled and easy to control.

There is a class of mechanism with same kinematics but different structures and performances in parallel mechanisms. Such mechanisms are called kinematically equivalent mechanisms. Kinematically equivalent mechanisms not only enrich the configurations of parallel mechanisms, but also provide designers with more effective options in practical applications. Chinese patent 201410468846.8 proposes a class of kinematically equivalent mechanisms based on the Tricept mechanism, which retains the excellent kinematic characteristics of the Tricept mechanism, provides more configurations with equivalent Tricept mechanism motion, and is expected to obtain a mechanism with more excellent performance. However, no related patents for over-constrained two-rotation parallel mechanisms with same kinematics have been found.

SUMMARY OF THE INVENTION

In view of the above, the present invention overcomes the shortcomings of the prior art, and proposes a class of over-constrained two-rotation parallel mechanism with high rigidity, large working space, perpendicular rotation axes, easy-to-control calibration, and same kinematics but different structures.

The technical scheme adopted by the present invention is a class of over-constrained two-rotation parallel mechanism with same kinematics, which includes a base, a moving platform and four branches connecting the base and the moving platform, wherein the base and the moving platform are both equilateral triangles, and the four branches connecting the base and the moving platform include a first branch, a second branch, a third branch, and a fourth branch, both ends of each of the first branch, the second branch and the third branch are respectively connected to end points of the base and the moving platform, both ends of the fourth branch are respectively connected to center points of the base and the moving platform, and the first branch and the second branch are driving branches, and a first rotating pair in the first branch and a first moving pair in the second branch are both driving pairs;

the first branch and the third branch both consist of a first rotating pair, a first link, a second rotating pair, a second link and a first ball pair to form an RRS series branch, a first end of the first link is connected to the base through the first rotating pair, a second end of the first link is connected to a first end of the second link through the second rotating pair, and the first link and the second link are both perpendicular to the axis of the second rotating pair, the axis of the first rotating pair is parallel to the axis of the second rotating pair, and a second end of the second link is connected to the moving platform through the first ball pair;

the second branch consists of a third rotating pair, a first moving pair, a first universal joint, a third link, and a fourth rotating pair to form an RPUR series branch, a first end of the first moving pair is connected to the base through the first third rotating pair, a second end of the first moving pair is connected to the first universal joint, the axis of the first rotating pair is parallel to the axis of the third rotating pair, the axis of the third rotating pair points to the center point of the base and is perpendicular to the first moving pair, the axis of the third rotating pair is parallel to the axis of an outer rotating pair of the first universal joint, a first end of the third link is connected to the first universal joint, and a second end of the third link is connected to the moving platform through the fourth rotating pair, the axis of an inner rotating pair of the first universal joint is parallel to the axis of the fourth rotating pair and is perpendicular to the third link, and the axis of the fourth rotating pair is parallel to a line connecting connection points of the first branch and the third branch with the moving platform; and the fourth branch consists of a second ball pair, a fourth link and a fifth rotating pair to form an SR series branch, and a first end of the fourth link is connected to the center point of the base through the second ball pair, a second end of the fourth link is connected to the center point of the moving platform through the fifth rotating pair, the axis of the fifth rotating pair is parallel to the axis of the fourth rotating pair, and is perpendicular to the fourth link.

The technical solution adopted in the second aspect of the present invention is a class of over-constrained two-rotation parallel mechanism with same kinematics, which includes a base, a moving platform and four branches connecting the base and the moving platform, wherein the base and the moving platform are both equilateral triangles, and the four branches connecting the base and the moving platform include a first branch, a second branch, a third branch, and a fourth branch, both ends of each of the first branch, the second branch and the third branch are respectively connected to end points of the base and the moving platform, both ends of the fourth branch are respectively connected to center points of the base and the moving platform, and the first branch and the second branch are driving branches, and a first rotating pair in the first branch and a first moving pair in the second branch are both driving pairs;

the first branch and the third branch both consist of a first rotating pair, a first link, a second rotating pair, a second link and a first universal joint to form a RRU series branch, a first end of the first link is connected to the base through the first rotating pair, a second end of the first link is connected to a first end of the second link through the second rotating pair, and the first link and the second link are both perpendicular to the axis of the second rotating pair, the axis of the first rotating pair is parallel to the axis of the second rotating pair, and a second end of the second link is connected to the moving platform through the first universal joint, the axis of the second rotating pair is parallel to the axis of an inner rotating pair of the first universal joint, and the axis of an outer rotating pair of the first universal joint in the first branch is collinear with the axis of an outer rotating pair of the first universal joint in the third branch;

the second branch consists of a third rotating pair, a first moving pair, a fourth rotating pair, a third link, and a fifth rotating pair to form an RPRR series branch, and a first end of the first moving pair is connected to the base through the third rotating pair, a second end of the first moving pair is connected to the fourth rotating pair, the axis of the first rotating pair is parallel to the axis of the third rotating pair, and the axis of the third rotating pair points to the center point of the base and is perpendicular to the axis of the fourth rotating pair, a first end of the third link is connected to the fourth rotating pair, and a second end of the third link connected to the moving platform through the fifth rotating pair, and the axis of the fourth rotating pair and the axis of the fifth rotating pair are both parallel to a line connecting connection points of the first branch and the third branch with the moving platform; and the fourth branch consists of a second universal joint, a fourth link and a sixth rotating pair to form a UR series branch, and a first end of the fourth link is connected to the center point of the base through the second universal joint, a second end of the fourth link is connected to the center point of the moving platform through the sixth rotating pair, the axis of the sixth rotating pair is parallel to the axis of the fifth rotating pair, the axis of an outer rotating pair of the second universal joint is collinear with the axis of the third rotating pair, and the axis of an inner rotating pair of the second universal joint is parallel to the axis of the sixth rotating pair and perpendicular to the fourth link.

The technical solution adopted in the third aspect of the present invention is a class of over-constrained two-rotation parallel mechanism with same kinematics, which includes a base, a moving platform and four branches connecting the base and the moving platform, wherein the base and the moving platform are both equilateral triangles, and the four branches connecting the base and the moving platform include a first branch, a second branch, a third branch, and a fourth branch, both ends of each of the first branch, the second branch and the third branch are respectively connected to end points of the base and the moving platform, both ends of the fourth branch are respectively connected to center points of the base and the moving platform, and the first branch and the second branch are driving branches, and a first rotating pair in the first branch and a first moving pair in the second branch are both driving pairs;

the first branch consists of a first rotating pair, a first link, a second rotating pair, a second link and a first universal joint to form an RRU series branch, and a first end of the first link is connected to the base through the first rotating pair, a second end of the first link is connected to a first end of the second link through the second rotating pair, and the first link and the second links are both perpendicular to the axis of the second rotating pair, the axis of the first rotating pair is parallel to the axis of the second rotating pair, and a second end of the second link is connected to the moving platform through the first universal joint, the axis of the second rotating pair is parallel to the axis of an inner rotating pair of the first universal joint, and the axis of an outer rotating pair of the first universal joint points to a first ball pair in the third branch;

the second branch consists of a second universal joint, a first moving pair, a third rotating pair, a third link, and a fourth rotating pair to form a UPRR series branch, a first end of the first moving pair is connected to the base through the second universal joint, a second end of the first moving pair is connected to the third rotating pair, the axis of an outer rotating pair of the second universal joint points to the center point of the base, and is parallel to the axis of the first rotating pair, the axis of an inside rotating pair of the second universal joint is parallel to the axis of the third rotating pair, and a first end of the third link is connected to the third rotating pair, and a second end of the third link is connected to the moving platform through the fourth rotating pair, the axis of the third rotating pair and the axis of the fourth rotating pair are both parallel to a line connecting connection points of the first branch and the third branch with the moving platform;

the third branch consists of a fifth rotating pair, a fourth link, a sixth rotating pair, a fifth link and a first ball pair to form an RRS series branch, and a first end of the fourth link is connected to the base through the fifth rotating pair, a second end of the fourth link is connected to a first end of the fifth link through the sixth rotating pair, the fourth link and the fifth link are both perpendicular to the axis of the sixth rotating pair, the axis of the fifth rotating pair and the axis of the sixth rotating pair are both parallel to the axis of an outer rotating pair of the second universal joint, and a second end of the fifth link is connected to the moving platform through the first ball pair;

the fourth branch consists of a third universal joint, a sixth link and a fourth universal joint to form a UU series branch, and a first end of the sixth link is connected to the center point of the base through the third universal joint, a second end of the sixth link is connected to the center point of the moving platform through the fourth universal joint, and the axis of an outer rotating pair of the third universal joint is collinear with the axis of an outer rotating pair of the second universal joint, the axis of an inner rotating pair of the third universal joint is parallel to the axis of an inner rotating pair of the fourth universal joint, and is perpendicular to the sixth link, the axis of an outer rotating pair of the fourth universal joint is perpendicular to the moving platform.

The technical solution adopted in the fourth aspect of the present invention is a class of over-constrained two-rotation parallel mechanism with same kinematics, which includes a base, a moving platform and four branches connecting the base and the moving platform, wherein the base and the moving platform are both equilateral triangles, and the four branches connecting the base and the moving platform include a first branch, a second branch, a third branch, and a fourth branch, both ends of each of the first branch, the second branch and the third branch are respectively connected to end points of the base and the moving platform, both ends of the fourth branch are respectively connected to center points of the base and the moving platform, and the first branch and the second branch are driving branches, and a first rotating pair in the first branch and a first moving pair in the second branch are both driving pairs;

the first branch consists of a first rotating pair, a first link, a second rotating pair, a second link, and a first ball pair to form an RRS series branch, and a first end of the first link is connected to the base through the first rotating pair, a second end of the first link is connected to a first end of the second link through the second rotating pair, and the first link and the second link are both perpendicular to the axis of the second rotating pair, the axis of the first rotating pair is parallel to the axis of the second rotating pair, and a second end of the second link is connected to the moving platform through the first ball pair;

the second branch consists of a first universal joint, a first moving pair, a third rotating pair, a third link, and a fourth rotating pair to form a UPRR series branch, and a first end of the first moving pair is connected to the base through the first universal joint, a second end of the first moving pair is connected to the third rotating pair, and the axis of an outer rotating pair of the first universal joint points to the center point of the base, and is parallel to the axis of the first rotating pair in the first branch, the axis of an inner rotating pair of the first universal joint is parallel to the axis of the third rotating pair, and a first end of the third link is connected to the third rotating pair, and a second end of the third link is connected to the moving platform through the fourth rotating pair, the axis of the third rotating pair and the axis of the fourth rotating pair are both parallel to a line connecting connection points of the first branch and the third branch with the moving platform;

the third branch consists of a second universal joint, a fourth link, a fifth rotating pair, a fifth link, and a third universal joint to form a URU series branch, and a first end of the fourth link is connected to the base through the second universal joint, a second end of the fourth link is connected to the fifth rotating pair, the axis of an outer rotating pair of the second universal joint is perpendicular to the base, the axis of an inner rotating pair of the second universal joint is parallel to the axis of the fifth rotating pair, a first end of the fifth link is connected to the fifth rotating pair, and a second end of the fifth link is connected to the moving platform through the third universal joint, the axis of the fifth rotating pair is parallel to the axis of an inner rotating pair of the third universal joint, and the axis of an outer rotating pair of the third universal joint points to the first ball pair; and the fourth branch consists of a second ball pair, a sixth link and a third ball pair to form an SS series branch, and a first end of the sixth link is connected to the center point of the base through the second ball pair, and a second end of the sixth link is connected to the center point of the moving platform through the third ball pair.

The characteristics and beneficial effects of the present invention are:

1, The present invention provides a class of over-constrained two-rotation parallel mechanism with same kinematics, each parallel mechanism has same kinematics and different structures, which enriches the configuration of the kinematically equivalent mechanism, especially the over-constrained two-rotation rotation equivalent mechanism, and the mechanism can be preferentially used according to different performance indexes.

2, The present invention provides a class of over-constrained two-rotation parallel mechanism with same kinematics, each parallel mechanism is an over-constrained mechanism including four constrained branches, with high rigidity and precision, large load-bearing capacity, and two perpendicular rotating axes, large rotating range, simple kinematic model, and easy control.

MAIN REFERENCE SIGNS

1—first branch; 2—second branch; 3—third branch; 4—fourth branch; 5—base; 6—moving platform; L—link; R—rotating pair; P—moving pair; S—ball pair; U—universal joint.

DETAILED DESCRIPTION

In order to detail the technical content, structural features, achieved objectives and effects of the present invention, the following will be described in detail with reference to the accompanying drawings of the specification.

Embodiment 1

Figure 1:
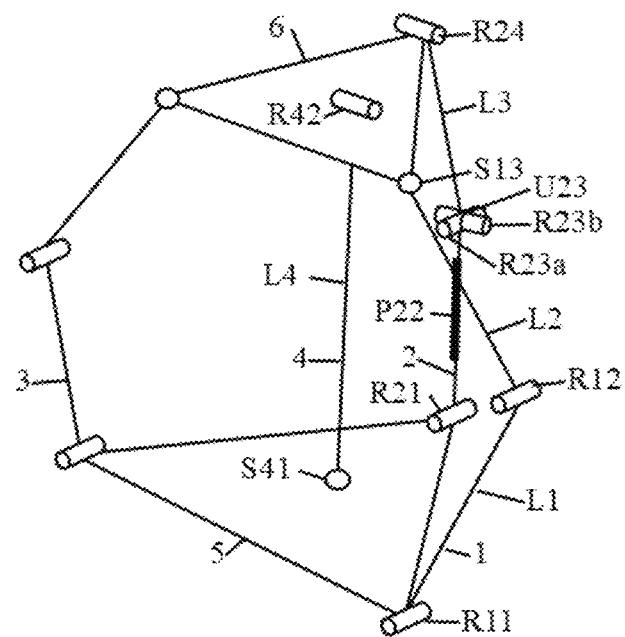
FIG. 1 is a schematic structural view of Embodiment 1 of a class of over-constrained two-rotation parallel mechanism with same kinematics of the present invention.

The present invention provides a class of over-constrained two-rotation parallel mechanism with same kinematics, as shown in FIG. 1, which includes a base 5, a moving platform 6 and four branches connecting the base and the moving platform, the base 5 and the moving platform 6 are both equilateral triangles, and the four branches connecting the base 5 and the moving platform 6 include a first branch 1, a second branch 2, a third branch 3, and a fourth branch 4. Both ends of each of the first branch 1, the second branch 2, and the third the branch 3 are respectively connected to the end points of the base 5 and the moving platform 6, both ends of the fourth branch 4 are respectively connected to the center points of the base 5 and the moving platform 6, the first branch 1 and the second branch 2 are driving branches, and the first rotating pair R11 in the first branch 1 and the first moving pair P22 in the second branch 2 are both driving pairs.

The first branch 1 and the third branch 3 both consist of a first rotating pair R11, a first link L1, a second rotating pair R12, a second link L2 and a first ball pair S13 to form an RRS series branch, a first end of the first link L1 is connected to the base 5 through the first rotating pair R11, a second end of the first link L1 is connected to a first end of the second link L2 through the second rotating pair R12, and both the first link L1 and the second link L2 are perpendicular to the axis of the second rotating pair R12, the axis of the first rotating pair R11 is parallel to the axis of the second rotating pair R12, and the second end of the second link L2 is connected to the moving platform 6 through the first ball pair S13.

The second branch 2 consists of a third rotating pair R21, a first moving pair P22, a first universal joint U23, a third link L3, and a fourth rotating pair R24 to form a RPUR series branch. A first end of the first moving pair P22 is connected to the base 4 through the third rotating pair R21, a second end of the first moving pair P22 is connected to the first universal joint U23, the axis of the first rotating pair iii R11 is parallel to the axis of the third rotating pair R21, and the axis of the third rotating pair R21 points to the center point of the base 4 and is perpendicular to the first moving pair P22, the axis of the third rotating pair R21 is parallel to the axis of the outer rotating pair R23a of the first universal joint U23, the first end of the third link L3 is connected to the first universal joint U23, the second end of the third link L3 is connected to the moving platform 6 through the fourth rotating pair R24, the axis of the inner rotating pair R23b of the first universal joint U23 is parallel to the axis of the fourth rotating pair R24 and is perpendicular to the third link L3, and the axis of the fourth rotating pair R24 is parallel to the line connecting the connection points of the first branch 1 and the third branch 3 with the moving platform 6.

The fourth branch 4 consists of a second ball pair S41, a fourth link L4 and a fifth rotating pair R42 to form an SR series branch. A first end of the fourth link L4 is connected to the center point of the base 5 through the second ball pair S41. A second end of the fourth link L4 is connected to the center point of the moving platform 6 through the fifth rotating pair R42. The axis of the fifth rotating pair R42 is parallel to the axis of the fourth rotating pair R24 and perpendicular to the fourth link L4. The first branch 1, the second branch 2, the third branch 3 and the fourth branch 4 together constitute a 2RRS+RPUR+SR over-constrained two-rotation parallel mechanism.

Embodiment 2

Figure 2:
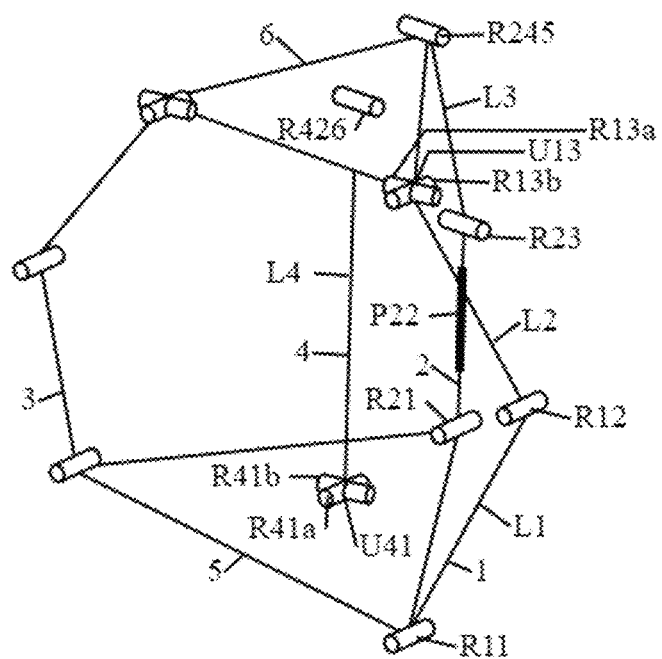
FIG. 2 is a schematic structural view of Embodiment 2 of a class of over-constrained two-rotation parallel mechanism with same kinematics of the present invention.

The technical solution adopted in the second aspect of the present invention, as shown in FIG. 2, includes a base 5, a moving platform 6, and four branches connecting the base and the moving platform. The base 5 and the moving platform 6 are both equilateral triangles, and the four branches connecting the base 5 and the moving platform 6 include a first branch 1, a second branch 2, a third branch 3, and a fourth branch 4. Both ends of each of the first branch 1, the second branch 2, and the third branch 3 are respectively connected to the end points of the base 5 and the moving platform 6, both ends of the fourth branch 4 are respectively connected to the center points of the base 5 and the moving platform 6. The first branch 1 and the second branch 2 are driving branches, and the first rotating pair R11 in the first branch 1 and the first moving pair P22 in the second branch 2 are both driving pairs.

The first branch 1 and the third branch 3 alternatively consist of a first rotating pair R11, a first link L1, a second rotating pair R12, a second link L2 and a first universal joint U13 to form a RRU series branch. A first end of the first link L1 is connected to the base 5 through the first rotating pair R11, a second end of the first link L1 is connected to a first end of the second link L2 through the second rotating pair R12, and the first link L1 and the second link L2 are both perpendicular to the axis of the second rotating pair R12, the axis of the first rotating pair R11 is parallel to the axis of the second rotating pair R12, and the second end of the second link L2 is connected to the moving platform 6 through the first universal joint U13, the axis of the second rotating pair R12 is parallel to the axis of the inner rotating pair R13b of the first universal joint U13, and the axis of the outer rotating pair R13a of the first universal joint U13 in the first branch 1 is collinear with the axis of the outer rotating pair R13a of the first universal joint U13 in the third branch 3.

The second branch 2 alternatively consists of a third rotating pair R21, a first moving pair P22, a fourth rotating pair R23, a third link L3, and a fifth rotating pair R245 to form a RPRR series branch. A first end of the first moving pair P22 is connected to the base 5 through the third rotating pair R21, a second end of the first moving pair P22 is connected to the fourth rotating pair R23, the axis of the first rotating pair R11 is parallel to the axis of the third rotating pair R21, and the axis of the third rotating pair R21 points to the center point of the base 5 and is perpendicular to the axis of the fourth rotating pair R23. The first end of the third link L3 is connected to the fourth rotating pair R23, and the second end of the third link L3 is connected to the moving platform 6 through the fifth rotating pair 8245, and the axis of the fourth rotating pair R23 and the axis of the fifth rotating pair R245 are both parallel to the line connecting the connection points of the first branch 1 and the third branch 3 with the moving platform 6.

The fourth branch 4 alternatively consists of a second universal joint U41, a fourth link L4 and a sixth rotating pair R426 to form a UR series branch. A first end of the fourth link L4 is connected to the center point of the base 5 through the second universal joint U41, a second end of the fourth link L4 is connected to the center point of the moving platform 6 through the sixth rotating pair R426, the axis of the sixth rotating pair R426 is parallel to the axis of the fifth rotating pair R245. The axis of the outer rotating pair R41a of the second universal joint U41 is collinear with the axis of the third rotating pair R21, and the axis of the inner rotating pair R41b of the second universal joint U41 is parallel to the axis of the sixth rotating pair R426 and perpendicular to the fourth link L4. The first branch 1, the second branch 2, the third branch 3 and the fourth branch 4 together constitute a 2RRU+RPRR+UR over-constrained two-rotation parallel mechanism.

Embodiment 3

Figure 3:
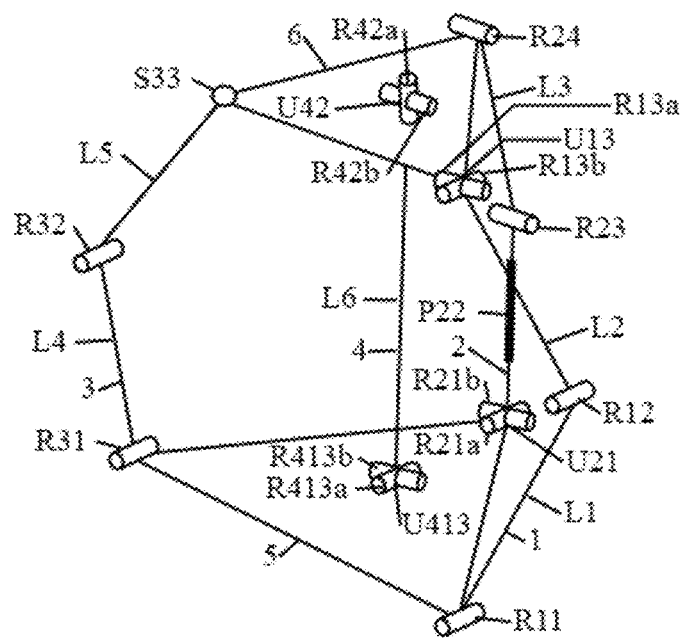
FIG. 3 is a schematic structural diagram of Embodiment 3 of a class of over-constrained two-rotation parallel mechanism with same kinematics of the present invention.

The technical solution adopted in the third aspect of the present invention, as shown in FIG. 3, includes a base 5, a moving platform 6, and four branches connecting the base and the moving platform. The base 5 and the moving platform 6 are both equilateral triangles, and the four branches connecting the base 5 and the moving platform 6 include a first branch 1, a second branch 2, a third branch 3, and a fourth branch 4. Both ends of each of the first branch 1, the second branch 2, and the third branch 3 are respectively connected to the end points of the base 5 and the moving platform 6, both ends of the fourth branch 4 are respectively connected to the center points of the base 5 and the moving platform 6. The first branch 1 and the second branch 2 are driving branches, and the first rotating pair R11 in the first branch 1 and the first moving pair P22 in the second branch 2 are both driving pairs.

The first branch 1 alternatively consists of a first rotating pair R11, a first link L1, a second rotating pair R12, a second link L2 and a first universal joint U13 to form a RRU series branch, a first end of the first link L1 is connected to the base 5 through the first rotating pair R11, a second end of the first link L2 is connected to a first end of the second link L2 through the second rotating pair R12, and the first link L1 and the second link L2 are both perpendicular to the axis of the second rotating pair R12, the axis of the first rotating pair R11 is parallel to the axis of the second rotating pair R12, the second end of the second link L2 is connected to the moving platform 6 through the first universal joint U13, the axis of the second rotating pair R12 is parallel to the axis of the inner rotating pair R13b of the first universal joint U13, and the axis of the outer rotating pair R13a of the first universal joint U13 points to the first ball pair S33 in the third branch 3.

The second branch 2 alternatively consists of a second universal joint U21, a first moving pair P22, a third rotating pair R23, a third link L3 and a fourth rotating pair R24 to form a UPRR series branch, a first end of the first moving pair P22 is connected to the base 5 through the second universal joint U21, a second end of the first moving pair P22 is connected to the third rotating pair R23, the axis of the outer rotating pair R21a of the second universal joint U21 points to the center point of the base 5, and is parallel to the axis of the first rotating pair R11 in the first branch 1, the axis of the inside rotating pair R21b of the second universal joint U21 is parallel to the axis of the third rotating pair R23, and the first end of the third link L3 is connected to the third rotating pair R23, and the second end of the third link L3 is connected to the moving platform 6 through the fourth rotating pair R24, the axis of the third rotating pair R23 and the axis of the fourth rotating pair R24 are both parallel to the line connecting the connection points of the first branch 1 and the third branch 3 with the moving platform 6.

The third branch 3 alternatively consists of a fifth rotating pair R31, a fourth link L4, a sixth rotating pair R32, a fifth link L5, and a first ball pair S33 to form an RRS series branch, and a first end of the fourth link L4 is connected to the base 5 through the fifth rotating pair R31, a second end of the fourth link L4 is connected to the first end of the fifth link L5 through the sixth rotating pair R32, and the fourth link L4 and the fifth link L5 are both perpendicular to the axis of the sixth rotating pair R32, the axis of the fifth rotating pair R31 and the axis of the sixth rotating pair R32 are both parallel to the axis of the outer rotating pair R21a of the second universal joint U21, and the second end of the fifth link L5 is connected to the moving platform 6 through the first ball pair S33.

The fourth branch 4 alternatively consists of a third universal joint U413, a sixth link L6 and a fourth universal joint U42 to form a UU series branch. The first end of the sixth link L6 is connected to the center point of the base 5 through the third universal joint U413, the second end of the sixth link L6 is connected to the center point of the moving platform 6 through the fourth universal joint U42, and the axis of the outer rotating pair R413a of the third universal joint U413 is collinear with the axis of the outer rotating pair R21a of the second universal joint U21, the axis of the inner rotating pair R413b of the third universal joint U413 is parallel to the axis of the inner rotating pair R42b of the fourth universal joint U42, and is perpendicular to the sixth link L6, the axis of the outer rotating pair R42a of the fourth universal joint U42 is perpendicular to the moving platform 6. The first branch 1, the second branch 2, the third branch 3, and the fourth branch 4 together constitute an RRU+UPRR+RRS+UU over-constrained two-rotation parallel mechanism.

Embodiment 4

Figure 4:
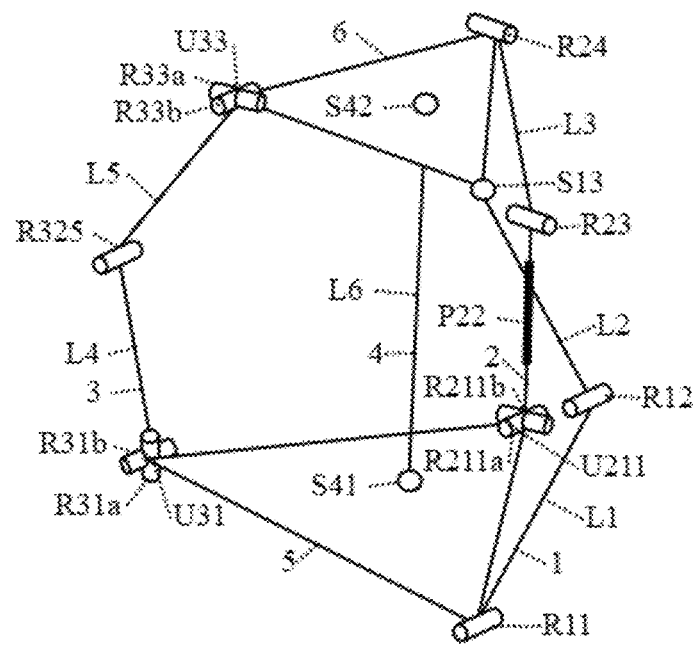
FIG. 4 is a schematic structural diagram of Embodiment 4 of a class of over-constrained two-rotation parallel mechanism with same kinematics of the present invention.

The technical solution adopted in the fourth aspect of the present invention, as shown in FIG. 4, includes a base 5, a moving platform 6, and four branches connecting the base and the moving platform. The base 5 and the moving platform 6 are both equilateral triangles, and the four branches connecting the base 5 and the moving platform 6 include a first branch 1, a second branch 2, a third branch 3, and a fourth branch 4. Both ends of each of the first branch 1, the second branch 2, and the third branch 3 are respectively connected to the end points of the base 5 and the moving platform 6, both ends of the fourth branch 4 are respectively connected to the center points of the base 5 and the moving platform 6, the first branch 1 and the second branch 2 are driving branches, and the first rotating pair R11 in the first branch 1 and the first moving pair P22 in the second branch 2 are both driving pairs.

The first branch 1 alternatively consists of a first rotating pair R11, a first link L1, a second rotating pair R12, a second link L2 and a first ball pair S13 to form an RRS series branch, and a first end of the first link L1 is connected to the base 5 through the first rotating pair R11, a second end of the first link L2 is connected to a first end of the second link L2 through the second rotating pair R12, and the first link L1 and the second link L2 are both perpendicular to the axis of the second rotating pair R12, the axis of the first rotating pair R11 is parallel to the axis of the second rotating pair R12, and the second end of the second link L2 is connected to the moving platform 6 through the first ball pair S13.

The second branch 2 alternatively consists of a first universal joint U211, a first moving pair P22, a third rotating pair R23, a third link L3 and a fourth rotating pair R24 to form a UPRR series branch, a first end of the first moving pair P22 is connected to the base 5 through the first universal joint U211, a second end of the first moving pair P22 is connected to the third rotating pair R23, the axis of the outer rotating pair R211a of the first universal joint U211 points to the center point of the base 5, and is parallel to the axis of the first rotating pair R11 in the first branch 1, the axis of the inner rotating pair R211b of the first universal joint U211 is parallel to the axis of the third rotating pair R23, and the first end of the third link L3 is connected to the third rotating pair R23, and the second end of the third link L3 is connected to the moving platform 6 through the fourth rotating pair R24, the axis of the third rotating pair R23 and the axis of the fourth rotating pair R24 are both parallel to the line connecting the connection points of the first branch 1 and the third branch 3 with the moving platform.

The third branch 3 alternatively consists of a second universal joint U31, a fourth link L4, a fifth rotating pair R325, a fifth link L5 and a third universal joint U33 to form a URU series branch, a first end of the fourth link L4 is connected to the base 5 through the second universal joint U31, a second end of the fourth link L4 is connected to the fifth rotating pair R325, the axis of the outer rotating pair R31a of the second universal joint U31 is perpendicular to the base 5, the axis of the inner rotating pair R31b of the second universal joint U31 is parallel to the axis of the fifth rotating pair R325, the first end of the fifth link L5 is connected to the fifth rotating pair R325, and the second end of the fifth link L5 is connected to the moving platform 6 through the third universal joint U33, the axis of the fifth rotating pair R325 is parallel to the axis of the inner rotating pair R33b of the third universal joint U33, and the axis of the outer rotating pair R33a of the third universal joint U33 points to the first ball pair S13.

The fourth branch 4 alternatively consists of a second ball pair S41, a sixth link L6 and a third ball pair S42 to form an SS series branch. The first end of the sixth link L6 is connected to the center point of the base 5 through the second ball pair S41, and the second end of the sixth link L6 is connected to the center point of the moving platform 6 through the third ball pair S42. The first branch 1, the second branch 2, the third branch 3, and the fourth branch 4 together constitute an RRS+UPRR+URU+SS over-constrained two-rotation parallel mechanism.

The above-mentioned embodiments only describe the preferred embodiments of the present invention and do not limit the scope of the present invention. Without departing from the design spirit of the present invention, various modifications and improvements made to the technical solutions of the present invention by a person of ordinary skill in the art shall fall within the scope of protection determined by the claims of the present invention.

What is claimed is:

1. An over-constrained two-rotation parallel mechanism, comprising a base, a moving platform and four branches connecting the base and the moving platform, wherein the base and the moving platform are equilateral triangles, and the four branches connecting the base and the moving platform include a first branch, a second branch, a third branch, and a fourth branch, both ends of each of the first branch, the second branch and the third branch are respectively connected to end points of the base and the moving platform, both ends of the fourth branch are respectively connected to center points of the base and the moving platform;

the first branch and the third branch each comprise a first rotating pair, a first link, a second rotating pair and a second link;

a first end of the first link is connected to the base through the first rotating pair, a second end of the first link is connected to a first end of the second link through the second rotating pair;

the first link and the second link are each perpendicular to the axis of the second rotating pair;

the axis of the first rotating pair is parallel to the axis of the second rotating pair, and a second end of the second link is connected to the moving platform;

the second branch comprises a third rotating pair, a first moving pair, a fourth rotating pair, a third link, and a fifth rotating pair;

a first end of the first moving pair is connected to the base through the third rotating pair, a second end of the first moving pair is connected to the fourth rotating pair;

the axis of the first rotating pair is parallel to the axis of the third rotating pair;

the axis of the third rotating pair points to the center point of the base and is perpendicular to the axis of the fourth rotating pair;

a first end of the third link is connected to the fourth rotating pair, and a second end of the third link is connected to the moving platform through the fifth rotating pair, and the axis of the fourth rotating pair and the axis of the fifth rotating pair are each parallel to a line connecting connection points of the first branch and the third branch with the moving platform; and the fourth branch comprises a fourth link, and a first end of the fourth link is connected to the center point of the base, a second end of the fourth link is connected to the center point of the moving platform.

2. The over-constrained two-rotation parallel mechanism of claim 1, wherein the first branch and the second branch are driving branches, and a first rotating pair in the first branch and a first moving pair in the second branch are driving pairs.

3. The over-constrained two-rotation parallel mechanism of claim 1, wherein the first branch comprises a first ball pair, and the second end of the second link of the first branch is connected to the moving platform through the first ball pair;

the second branch comprises a first universal joint comprising an inner rotating pair and the third rotating pair as an outer rotating pair, the first end of the first moving pair is connected to the first universal joint, the axis of the inner rotating pair of the first universal joint is parallel to the line;

the third branch comprises a second universal joint comprising an outer rotating pair and the first rotating pair of the third branch as an inner rotating pair, and a third universal joint, the second end of the second link of the third branch is connected to the moving platform through the third universal joint and the first end of the first link is connected to the base through the second universal joint, the axis of the outer rotating pair of the second universal joint is perpendicular to the base, the axis of an inner rotating pair of the third universal joint is parallel to the axis of the second rotating pair, the axis of an outer rotating pair of the third universal joint points to the first ball pair in the first branch; and the fourth branch comprises a second ball pair and a third ball pair, and the first end of the fourth link is connected to the center point of the base through the second ball pair, the second end of the fourth link is connected to the center point of the moving platform through the third ball pair.

4. The over-constrained two-rotation parallel mechanism of claim 1, wherein the first branch and the third branch each comprise a first ball pair, and the second end of the second link is connected to the moving platform through the first ball pair;

the second branch comprises a first universal joint comprising an outer rotating pair and the fourth rotating pair as an inner rotating pair, the second end of the first moving pair is connected to the first universal joint, the axis of the third rotating pair is parallel to the axis of the outer rotating pair of the first universal joint, the first end of the third link is connected to the first universal joint; and the fourth branch comprises a second ball pair and a fifth rotating pair, and the first end of the fourth link is connected to the center point of the base through the second ball pair, the second end of the fourth link is connected to the center point of the moving platform through the fifth rotating pair, the axis of the fifth rotating pair is parallel to the axis of the fourth rotating pair, and is perpendicular to the fourth link.

5. The over-constrained two-rotation parallel mechanism of claim 1, wherein the first branch and the third branch each comprise a first universal joint, and the second end of the second link is connected to the moving platform through the first universal joint, the axis of the second rotating pair is parallel to the axis of an inner rotating pair of the first universal joint, and the axis of an outer rotating pair of the first universal joint in the first branch is collinear with the axis of an outer rotating pair of the first universal joint in the third branch;

the fourth branch comprises a second universal joint and a sixth rotating pair, and the first end of the fourth link is connected to the center point of the base through the second universal joint, the second end of the fourth link is connected to the center point of the moving platform through the sixth rotating pair, the axis of the sixth rotating pair is parallel to the axis of the fifth rotating pair, the axis of an outer rotating pair of the second universal joint is collinear with the axis of the third rotating pair, and the axis of an inner rotating pair of the second universal joint is parallel to the axis of the sixth rotating pair and perpendicular to the fourth link.

6. The over-constrained two-rotation parallel mechanism of claim 1, wherein the first branch comprises a first universal joint, the second end of the second link is connected to the moving platform through the first universal joint, the axis of the second rotating pair is parallel to the axis of an inner rotating pair of the first universal joint;

the second branch comprises a second universal joint comprising an inner rotating pair and the third rotating pair as an outer rotating pair, the first end of the first moving pair is connected to the base through the second universal joint, the axis of the inner rotating pair of the second universal joint is parallel to the axis of the fourth rotating pair;

the third branch comprises a first ball pair, and the second end of the second link is connected to the moving platform through the first ball pair, and the axis of an outer rotating pair of the first universal joint points to the first ball pair in the third branch;

the fourth branch comprises a third universal joint and a fourth universal joint, and the first end of the fourth link is connected to the center point of the base through the third universal joint, the second end of the fourth link is connected to the center point of the moving platform through the fourth universal joint, and the axis of an outer rotating pair of the third universal joint is collinear with the axis of the outer rotating pair of the second universal joint, the axis of an inner rotating pair of the third universal joint is parallel to the axis of an inner rotating pair of the fourth universal joint; and is perpendicular to the fourth link, the axis of an outer rotating pair of the fourth universal joint is perpendicular to the moving platform.

* * * * *